Jan. 5, 1954   P. E. CHOLLET   2,664,709
POWER UNIT FOR TIRE INSPECTION STANDS
Filed July 12, 1951   2 Sheets-Sheet 1

INVENTOR
PHILIP E. CHOLLET
By Herbert A. Minturn,
ATTORNEY

Jan. 5, 1954 P. E. CHOLLET 2,664,709
POWER UNIT FOR TIRE INSPECTION STANDS
Filed July 12, 1951 2 Sheets-Sheet 2
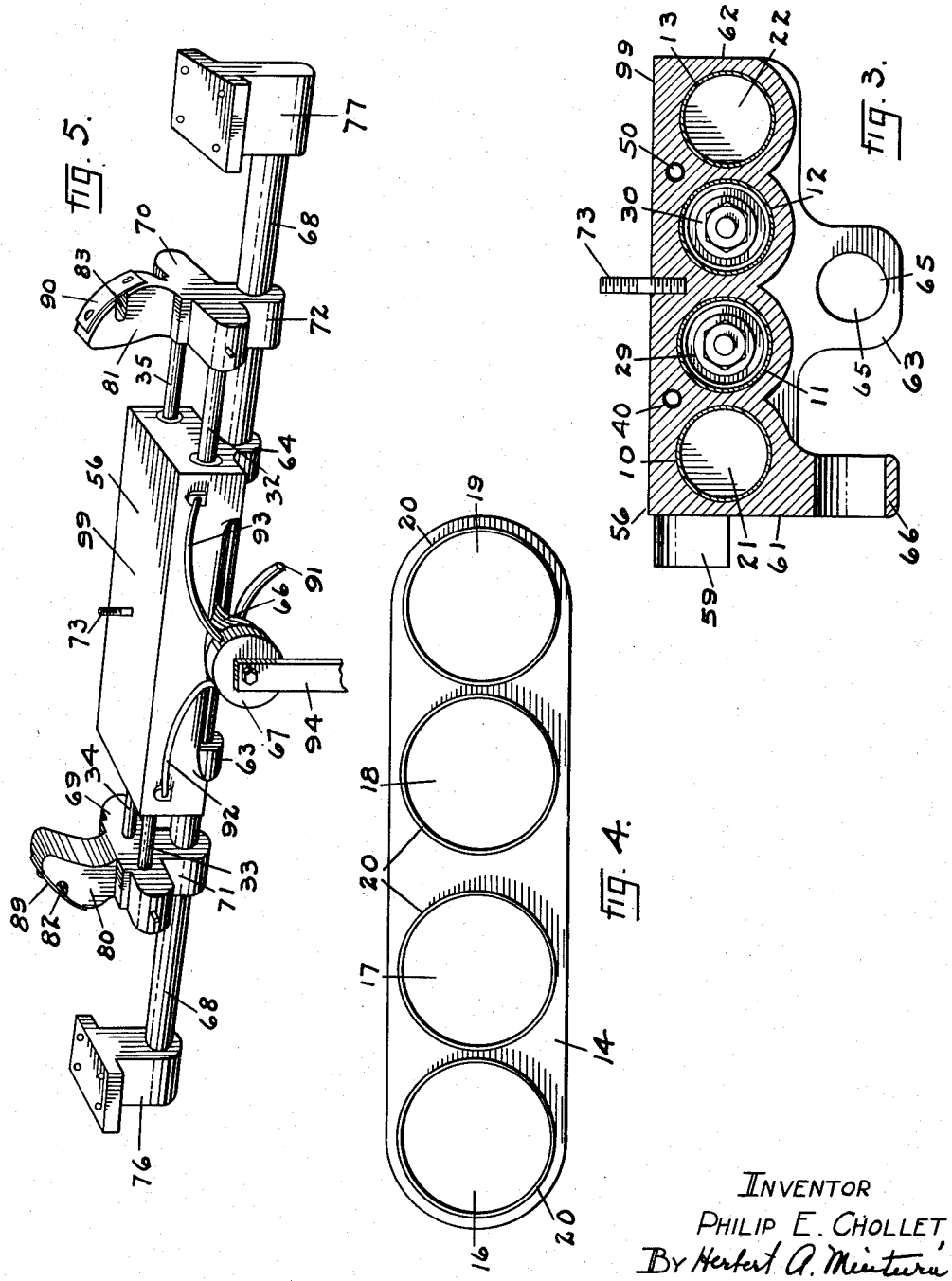
INVENTOR
PHILIP E. CHOLLET
By Herbert A. Minturn,
ATTORNEY Patented Jan. 5, 1954

2,664,709

UNITED STATES PATENT OFFICE 2,664,709

POWER UNIT FOR TIRE INSPECTION STANDS

Philip E. Chollet, Indianapolis, Ind.

Application July 12, 1951, Serial No. 236,402

3 Claims. (Cl. 60—97)

This invention relates to a structure of a power unit hydraulically operated such as by air for spreading apart the beads of an automobile tire casing when supported on a stand. The invention particularly relates to a power unit which may be applied to that type of structure which is illustrated in the U. S. Letters Patent No. 2,173,795 granted September 19, 1939. The invention constitutes not only the structure, but also the method of producing it, wherein there are a plurality of pre-formed cylinders initially spaced apart and interconnected with suitable flow lines and then formed into a unitary mass to serve as the power operating source and to carry the necessary cross heads and guide bar together with the control valve.

In regard to the control valve, reference is made to a second application being filed by me along with this present application, the second application being drawn to the control valve itself. This second application was filed July 12, 1951, Serial No. 236,401.

A primary purpose of the invention is to provide a complete, compact unit which may be applied to the stand with a minimum amount of labor. A further important object of the invention is to provide a power unit wherein all of the various moving parts are maintained in proper alignment so as to promote easy and smooth operation of the shiftable elements.

These and many other objects and advantages of the invention will become apparent to those versed in the art in the following description of one particular form of the invention as illustrated in the accompanying drawings, in which Fig. 1 is a view in prospective of a stand to which the invention is applied;

Fig. 3 is a view in vertical transverse section on the line 3—3 in Fig. 2;

Fig. 4 is a view on an enlarged scale in elevation of a cylinder spacer; and

Fig. 5 is a view in perspective of the power unit assembly.

Figure 1:
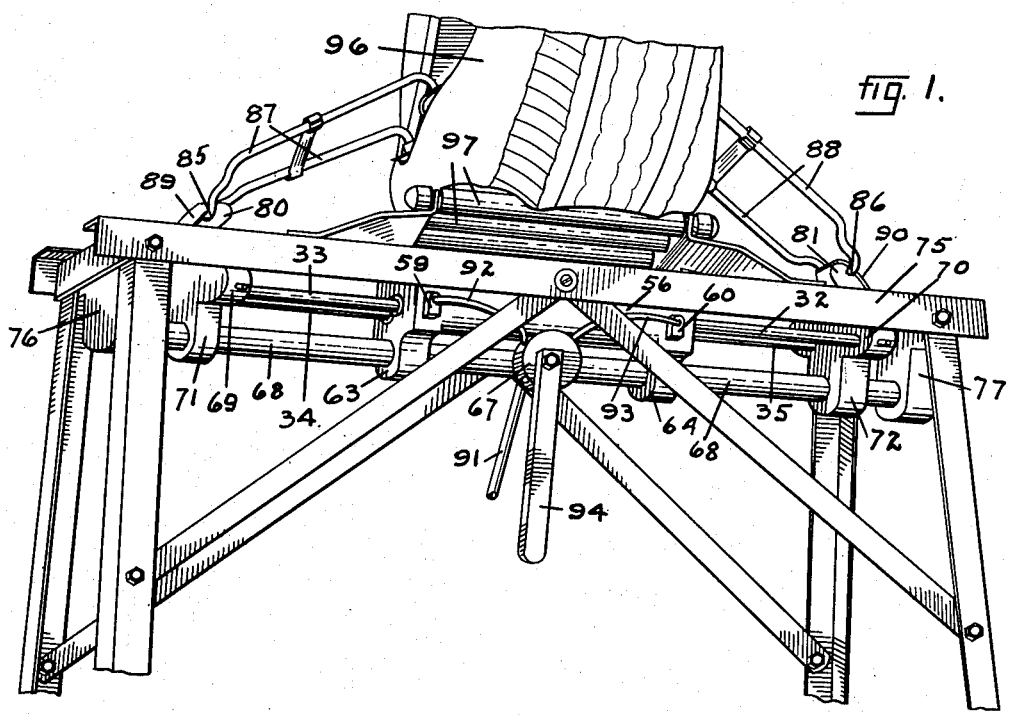

Four tubes 10, 11, 12, and 13 are formed to serve as cylinders. Each of these tubes has substantially the same length, and is initially aligned with the other cylinders by inserting ends of those cylinders through the spacing plates 14 and 15, the plates being identical one with the other. As illustrated in Fig. 4, the plate 14 is provided with four openings 16, 17, 18, and 19, therethrough, each opening having a marginal flange 20 extending outwardly from the plate.

Figure 2:
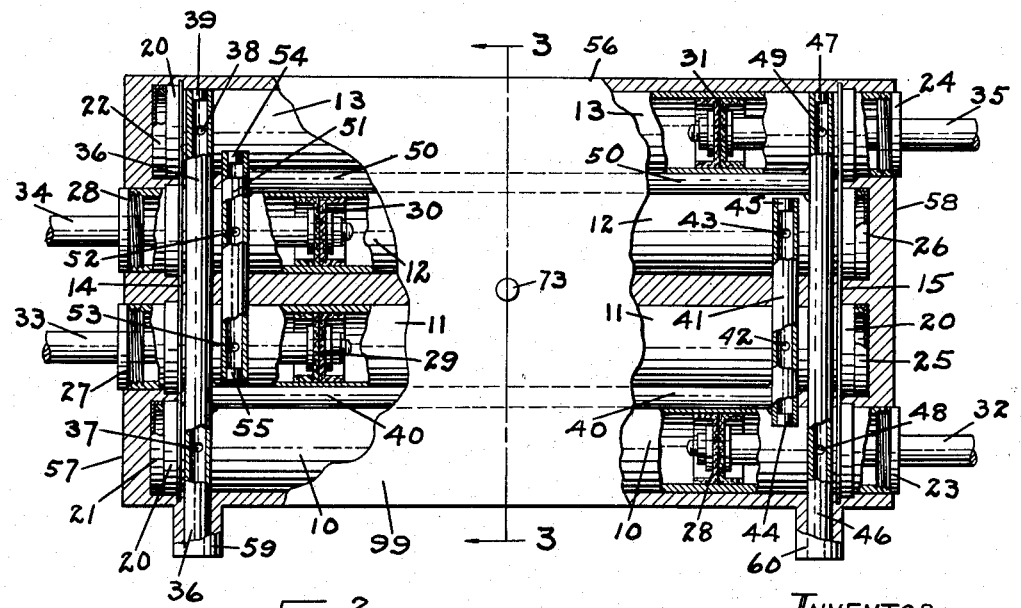
Fig. 2 is a top plan view and partial section of the cylinder assembly.

The spacing plates 14 and 15 have their holes so positioned across the length of those plates as to space the tubes 10 and 11 a distance apart equal the spacing apart of the tubes 12 and 13, with a larger spacing being maintained between the tubes 11 and 12, Fig. 2.

The tubes 10 and 13, have their left hand ends as viewed therein closed by caps 21 and 22, secured initially in place by any suitable means, such as by brazing. The opposite ends of these tubes 10 and 13 are suitably provided to receive and maintain therein the piston rod guide plugs 23 and 24, herein shown as being screw threadedly interconnected with those tubes. The inner, adjacent tubes 11 and 12, have their right hand ends closed by the caps 25 and 26 secured initially in place by any suitable means such as by brazing. As indicated in Fig. 2, the spacer plates 14 and 15 have their flanges 20 in substantial abutment with the closure caps 21, 22, and 25, 26. Preferably these spacer plates are anchored to the respective tubes by any suitable means, such as being brazed thereto.

The left hand ends of the tubes 11 and 12 detachably receive therein the piston guide plugs 27 and 28, herein shown as being screw threadedly received in the ends of those tubes.

Within tubes 10, 11, 12, and 13, there are respectively slidably carried the respective pistons 28, 29, 30, and 31. These pistons are respectively secured to the inner ends of piston rods 32, 33, 34, and 35, these rods slidably extending outwardly through the guide plugs 23, 27, 28, and 24, all as viewed in Fig. 2.

A cross tube 36 is laid across the topsides of the left hand end portions of the tubes, to be secured particularly to the outer tubes 10 and 13, and to have transverse passageways 37 and 38 intercommunicating between that tube 36 and the tubes 10 and 13. The tube 36 is closed at one end by any suitable means such as by the plug 39, and is left open at its other end. There is a longitudinally disposed tube 40 intercommunicating with the tube 36 at any suitable position, herein shown as intermediate the cylinder tubes 10 and 11. This tube 40 leads along between the tubes 10 and 11, spaced thereabove, to intercommunicate by its other end with the short cross tube 41 which in turn extends laterally across the right hand end portions of the tubes 11 and 12 to have passageways 42 and 43 intercommunicating through the tube 41 therebetween. This tube 41 is closed off at both ends by any suitable means, such as by the plugs 44 and 45.

A transverse tube 46 extends across all four of the tubes 10, 11, 12, and 13, between the short tube 41 and the spacer plate 15, Fig. 2. This tube 46 is closed at one end by any suitable means such as by the plug 47, and is left open at its opposite end. The tube 46 is provided with the passageways 48 and 49 which intercommunicate between the tube 46 and the tubes 10 and 13.

There is a longitudinal tube 50 intercommunicating with the tube 46 to extend longitudinally along and intermediate the tubes 12 and 13 to communicate by its opposite end with a short transverse tube 51 which lies across the inner cylinder tubes 11 and 12 across the left hand end portions thereof parallel to the tube 36 and inside thereof. That is, the tube 51 is spaced along the topsides of the tubes 11 and 12 inwardly from the tube 36. The tube 51 intercommunicates with the tubes 11 and 12 through the passageways 52 and 53, this tube 52 being closed off at its outer ends by means of the plugs 54 and 55.

With the tubes 10, 11, 12, and 13, so assembled in respect to their spacer plates 14 and 15, and the various interconnecting tubes as just described, this assembly is invested within a surrounding mass of metal such as aluminium, and generally designated by the numeral 56. The metal 56 is flowed in between the various cylinder tubes, and across the capped ends, but terminates by end faces 57 and 58 at the outer ends of the open ends of those tubes into which the piston plugs 23, 24, 27, and 28 are positioned. Then the outer ends of the tubes 36 and 46 are reinforced by bosses of the metal, these bosses being designated by the numerals 59 and 60. The general overall shape of the mass of metal 56 is rectangular, in respect to the top face 99, the side faces 61 and 62, and the end faces 57 and 58. The underside of the mass 56 is corrugated to follow generally the curvature of the tubes from their undersides only.

From the underside of the mass 56 there are provided the downwardly extending ears 63 and 64, each being bored out with a circular hole 65, Fig. 3. There is also provided a downwardly extending valve mounting boss 66 which is provided to support the control valve 67. Thus, with the cylinder tubes 10, 11, 12, 13, and the interconnecting tube system, the assembly is secured in a rigid mass of the binding metal 56 so that all parts are then maintained in a secure, fixed manner, and are also held against leakage.

A guide bar 68 is passed through the ears 63 and 64, through the hole 65 and thus secured in position against longitudinal travel relative to the mass of metal hereinafter termed the control head block 56. On each side of the block 56, there are placed crossheads 69 and 70, each having a downturned leg 71 and 72 respectively through which the bar 68 extends so that these crossheads 69 and 70 may be guided to slide therealong. The piston rods 32 and 35 have their outer ends secured to the crosshead 70 and the piston rods 33 and 34 have their outer ends secured to the crosshead 69.

From the top face 99 of the block 56, there extends a stud 73 which is used to support the block 56 in conjunction with the stand 75, Fig. 1. This block 56 is mounted centrally of the stand 75 from its under side by means of the stud 73, and then there are end blocks 76 and 77 which are also attached to the stand 75 to support the outer ends of the guide bar 68.

Each of the crossheads 69 and 70 is provided with an upwardly extending neck 80 and 81 respectively, across the outer, upper surfaces of which extend slots 82 and 83 respectively, receiving therein the webs 85 and 86 of the tire engaging arms 87 and 88, Fig. 1. The webs 85 and 86 are retained within their respective slots 82 and 83 by plates 89 and 90 overlapping those slots.

A supply of air under pressure is brought to the valve 67 through the hose 91. Between the valve 67 and the tubes 36 and 46, there are the interconnecting pipes 92 and 93, these pipes 92 and 93 connecting through the bosses 59 and 60 with those tubes 36 and 46. The valve 67 is provided with an operating lever 94 by means of which the valve 67 may be operated to put pressure selectively into either pipe 92 or 93, to leave those pipes in a closed-off position, and to selectively permit the exhaust of the air through either one of the pipes. The normal operation would be such that when the handle 94 is turned from its normal vertically depending position as indicated in Figs. 1 and 5, the pipe 92, for example, may be supplied with air under pressure, whereupon the crossheads 69 and 70 would be moved along the guide bar 68 toward the block 56. Then with the handle 94 turned to the right, for example, air would be released through the valve from the pipe 92, and air under pressure would be supplied through the pipe 93 to spread apart those crossheads 69 and 70. The crossheads 69 and 70 may be maintained in any positions desired along the bar 68 by returning the operating handle 94 to the central position.

More specifically, the operation is as follows. A casing 96 is placed upon the rollers 97 of the stand 75, and the arms 87 and 88 are rocked over onto the beads of the casing. Then the valve 67 is manipulated by means of the handle 94 to supply air through the pipe 92 to the cross tube 36. The air under pressure in tube 36 escapes into the left hand ends of the tubes 10 and 13 via ports 37 and 38, respectively, in tube 36 and into the right hand ends of the tubes 11 and 12 via longitudinal tube 40, short cross tube 41 and ports 42 and 43 therein, in each instance forcing the respective pistons 28, 29, 30, and 31, outwardly toward the faces 57 and 58 respectively so as to carry the crossheads 69 and 70 through their respective interconnecting piston rods so as to spread apart the crossheads 69 and 70, and thereby fold the arms 87 and 88 outwardly toward the ends of the stand 75 to spread apart the beads of the tire casing 96. That spread apart condition may be maintained by suitable manipulating of the valve 67 so that the pressure is maintained against the pistons as above indicated, without any exhaust being permitted.

After the casing 96 has been inspected, as may be desired, the valve 67 is manipulated so as to open the pipe 92 to the atmosphere through the valve 67 as an exhaust line and air supplied under pressure through the pipe line 93 flows into right hand ends of the tubes 10 and 13 via tube 46 and ports 48 and 49 therein, and into the left hand ends of the tubes 11 and 12 via longitudinal tubes 50, short cross tube 51 and ports 52 and 53 therein, pushing the pistons inwardly of those tubes so as to move the crossheads 69 and 70 toward the block 56, and correspondingly cause the arms 87 and 88 to travel accordingly to release their pull on the casing 96.

Thus it may be seen that there is provided a very compact and simple attaching unit to a tire inspection stand which has heretofore been operated manually. The structure embodying the invention provides for a smooth operation of the arms 87 and 88, and also provides as means for maintaining the desired spacing of the beads of the casing, and this is of particular importance because there will be different sizes of casings to be inspected, and the mechanism accommodates itself very readily to those different sizes.

Therefore while I have herein shown and described my invention in the one particular form as now best known to me, it is obvious that structural changes may be embodied without departing from the spirit of the invention, and I therefore do not desire to be limited to that precise form beyond the limitations which may be imposed by the following claims.

I claim:

1. An operating unit comprising a pair of cylinders closed off at both ends; a second pair of cylinders closed off at both ends; said cylinders in each of said pairs being interconnected by passageways at both ends, and having a passageway in each instance interconnecting the passageway between one set of ends in one cylinder pair, with the passageway between the opposite set of ends in the second cylinder pair; a piston in each of said cylinders; and a piston rod connected to each of said pistons and extending through common ends of the cylinders in one pair in one outward direction, and through the opposite, common ends of the cylinders in the second pair; means for supporting said cylinders in fixed relation one with the other; a guide bar fixed to said means; and crossheads fixed respectively to said rods of each cylinder pair; said crossheads being slidably engaged on said bar.

2. A power drive unit comprising a pair of side by side aligned inner cylinder tubes; caps across one set of common ends of the tubes; short cross tubes one each interconnecting opposite ends of the cylinder tubes; a second pair of tubes, one each along the outer sides of said inner cylinder tubes, wherein the said inner cylinder tubes both lie between the outer cylinder tubes; long cross tubes, one each interconnecting opposite end parts of the outer cylinder tubes; caps across one set of common ends of the outer tubes, said common ends thereof being opposite to the said common ends of the inner tubes; a longitudinally disposed tube interconnecting one said short tube at one cylinder tube end with one said long tube at the other cylinder tube end in each instance; and a metal investment about all of said inner and outer cylinder tubes and all of said interconnecting tubes, and about said cylinder tube caps, common opposite ends of the inner cylinder tubes opening through one end of the investment and common opposite ends of the outer cylinder tubes opening through the opposite end of the investment; said long tubes each opening outwardly from said investment a piston in each cylinder tube; and a rod extending respectively from each piston outwardly from its cylinder tube end opening through said investment.

3. A power drive unit comprising a pair of side by side aligned inner cylinder tubes; caps across one set of common ends of the tubes; short cross tubes one each interconnecting opposite ends of the cylinder tubes; a second pair of tubes, one each along the outer sides of said inner cylinder tubes; wherein the said inner cylinder tubes both lie between the outer cylinder tubes; long cross tubes, one each interconnecting opposite end parts of the outer cylinder tubes; caps across one set of common ends of the outer tubes, said common ends thereof being opposite to the said common ends of the inner tubes; longitudinally disposed tube interconnecting one said short tube at one cylinder tube end with one said long tube at the other cylinder tube end in each instance; and a metal investment about all of said inner and outer cylinder tubes and all of said interconnecting tubes, and about said cylinder tube caps, common opposite ends of the inner cylinder tubes opening through one end of the investment and common opposite ends of the outer cylinder tubes opening through the opposite end of the investment; said long tubes each opening outwardly from said investment; a guide bar fixed along a side of said investment; crossheads slidably carried on the bar, one on each side of said investment; a piston in each of said cylinder tubes; a rod fixed to a piston in each instance extending therefrom two to one crosshead and two to the other crosshead; and valve means interconnected with said long tube outer opening.

PHILIP E. CHOLLET.

References Cited in the file of this patent

UNITED STATES PATENTS

| Number | Name | Date |
|---|---|---|
| 254,741 | Walsh | Mar. 7, 1882 |
| 875,021 | Westbrook | Dec. 31, 1907 |
| 1,234,878 | Corvin | July 31, 1917 |
| 1,995,419 | Derrom | Mar. 26, 1935 |
| 2,111,134 | Allin | Mar. 15, 1938 |
| 2,473,507 | Bullard | June 21, 1949 |
| 2,545,260 | Cole | Mar. 13, 1951 |